(No Model.)

E. J. WILLIS.
VELOCIPEDE SADDLE.

No. 458,609.   Patented Sept. 1, 1891.

WITNESSES

INVENTOR
Ernest J. Willis.
by Simonds & Burdett
Attorneys

UNITED STATES PATENT OFFICE.

ERNEST JAMES WILLIS, OF LONDON, ENGLAND.

VELOCIPEDE-SADDLE.

SPECIFICATION forming part of Letters Patent No. 458,609, dated September 1, 1891.

Application filed November 4, 1890. Serial No. 370,353. (No model.) Patented in England July 14, 1890, No. 16,145.

*To all whom it may concern:*

Be it known that I, ERNEST JAMES WILLIS, a subject of the Queen of Great Britain, and a resident of London, in the county of Middlesex, England, have invented certain new and useful Improvements in Velocipede-Saddles, of which the following is a full, clear, and exact description, whereby any one skilled in the art can make and use the same.

The object of my invention is to provide a saddle that shall be particularly adapted for use on velocipedes and that class of wheeled vehicles as bicycles, tricycles, and the like, although its use is not restricted or limited to any specific form of vehicle.

My invention consists in the combination, with a frame, of a suspended seat secured at one end to the frame and at the other to a lever, in combination with a yielding support interposed between the lever and the saddle-frame.

It further consists in details of the several parts of the device making up the seat as a whole, as more particularly hereinafter described, and pointed out in the claims.

Figure 1:
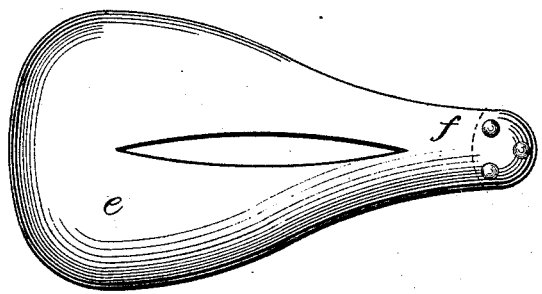
Figure 2:
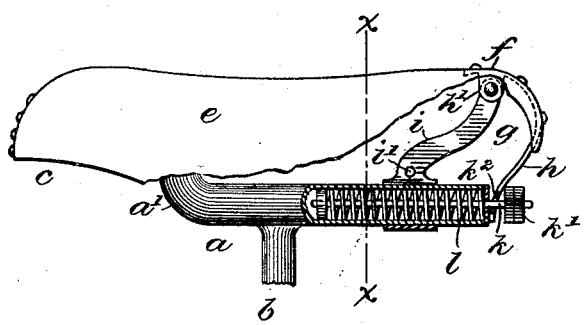
Figure 3:
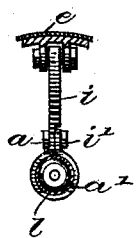

Referring to the drawings, Figure 1 is a top or plan view of my improved saddle. Fig. 2 is a side view of the same with parts cut away to show construction. Fig. 3 is a detail view, in cross-section, of the saddle on line $x \, x$ of Fig. 2.

The invention described and claimed herein forms the subject-matter of Letters Patent of Great Britain granted to me July 14, 1890, and numbered 16,145.

In the accompanying drawings, the letter $a$ denotes the frame of a saddle that is preferably made of metal, as iron or steel, formed to the shape suitable for adapting it to be fastened to the main frame of a velocipede or other vehicle. The saddle herein described, and illustrated in the drawings, is of a shape and construction especially intented and adapted for use on a bicycle or tricycle. The frame $a$ is provided with a stem or standard $b$, that may be inserted and clamped in a socket in the supporting main frame of the bicycle. At the rear the frame is turned upward and is broadened so as to form a cantle $c$, and it is tubular in the part $a'$ in front of the cantle. The seat $e$ is usually made of leather, and it is suspended on the frame between the cantle $c$ and the pommel $f$. The latter is formed by the upper end of a yielding support $g$, that in the form shown consists of a bent lever $h$, pivoted at $h'$ to the upper end of the upright arm $i$. This bent lever $h$ is secured to the seat at $f$, and at its lower end it engages a spring-retained bolt $k$, a slot $k^2$ forming the opening through which the bolt passes and permitting a limited play at this point of connection. The upright arm $i$ is adjustably secured to the frame $a$, so as to enable it to be moved along the frame and used in holding the flexible and suspended seat $e$ at the desired degree of tension. The lower end of the arm is tubular to fit upon the frame, and split, so that a clamping bolt or screw $i'$ is used to clamp it to the frame. The weight of a rider upon the saddle throws a strain upon the bent lever $h$ and tends to tilt or rock it on the hinge or pivot at the upper end of the arm $i$, but this tendency to rock is resisted by the spring $l$, that is located in the tubular part $a'$ of the frame between the rail of the socket at one end and the nut-head or shoulder on the bolt $k$ at the other end. On the outer end of the bolt are arranged the nuts $k'$, that serve as a means of securing the lower end of the bent lever, and also of adjusting the working tension of the spring that forms an element of the yielding support. This adjustability of the spring is desirable to adapt the saddle readily for use of riders of various weights.

It is obvious that this device is susceptible of various changes and modifications in details without departing from my invention, and I do not limit myself to the specific construction above described.

I claim as my invention—

1. In combination, in a saddle, a frame, a flexible seat connected to and suspended over the frame from the cantle to the pommel, the arm pivoted to the frame and to the bent lever, the bent lever secured to the seat at the pommel, and the yielding connecting part uniting said lever to the frame, all substantially as described.

2. In combination, in a saddle for bicycles and the like vehicles, a saddle-frame having a supporting-stem on the under side, an upturned part united to the cantle, and a front part to which is connected a yielding saddle-support, and the saddle-support comprising the arm pivotally attached to an adjustable sleeve on the frame and to the bent lever, the bent lever secured to the saddle, and the spring connecting the bent lever and the frame, all substantially as described.

3. In combination, in a saddle, a frame, a seat suspended over the frame, an adjustable arm forming the support at one end of the saddle, a bent lever pivoted to the said arm, a spring connecting one end of the bent lever to the frame, and the adjustable connecting means, all substantially as described.

4. In combination, in a saddle, a frame, a seat suspended over the frame, an adjustable upright arm secured to the frame, a bent lever hinged to the arm and connected at one end to the seat and at the other to a spring-retained bolt, the spring-socket formed in the tubular end of the frame, the bolt held at one end in said socket, and the spring located in said socket, all substantially as described.

ERNEST JAMES WILLIS.

Witnesses:
GEO. W. REED,
AMOS BONSALL.